United States Patent [19]

Wendell et al.

[11] Patent Number: 5,616,239

[45] Date of Patent: Apr. 1, 1997

[54] SWIMMING POOL CONTROL SYSTEM HAVING CENTRAL PROCESSING UNIT AND REMOTE COMMUNICATION

[76] Inventors: Kenneth Wendell, 107 Lodge Ave., Huntington, N.Y. 11746; Sven Faret, 30-A Main Pkwy., Plainview, N.Y. 11803

[21] Appl. No.: 402,104

[22] Filed: Mar. 10, 1995

[51] Int. Cl.⁶ .......................... B01D 17/12; B01D 35/027
[52] U.S. Cl. ...................... 210/86; 4/508; 210/87; 210/110; 210/143; 210/149; 210/169; 210/416.2
[58] Field of Search ............... 4/508, 510; 137/554; 210/85, 86, 87, 91, 93, 94, 103, 104, 110, 134, 137, 138, 143, 149, 169, 193, 257.1, 257.2, 258, 416.2, 929, 90; 251/129.15; 364/509, 510; 15/1.7

[56] References Cited

U.S. PATENT DOCUMENTS

| | | | |
|---|---|---|---|
| 4,127,485 | 11/1978 | Baker et al. | 210/169 |
| 4,133,058 | 1/1979 | Baker | 4/508 |
| 4,322,297 | 3/1982 | Bajka | 210/742 |
| 4,370,983 | 2/1983 | Lichtenstein | 210/929 |
| 4,421,643 | 12/1983 | Frederick | 210/138 |
| 4,627,118 | 12/1986 | Baker | 4/508 |
| 4,676,914 | 6/1987 | Mills et al. | 210/169 |
| 4,685,158 | 8/1987 | Lively | 4/508 |
| 4,817,217 | 4/1989 | Lively | 4/508 |
| 4,997,558 | 3/1991 | Baker | 210/169 |
| 5,047,146 | 9/1991 | Bastenhof | 210/169 |
| 5,329,465 | 7/1994 | Arcella et al. | 137/554 |
| 5,422,014 | 6/1995 | Allen et al. | 210/143 |

*Primary Examiner*—Joseph W. Drodge
*Attorney, Agent, or Firm*—Dilworth & Barrese

[57] ABSTRACT

The present invention relates to a control system adapted to control water flow in a swimming pool system including a swimming pool having a filter tank. The pool control system includes a control circuit for controlling at least a first pool water valve assembly and a second valve assembly so as to control water flow to the filter tank and from the filter tank to the swimming pool. The control circuit is adapted to maintain the water levels in the filter tank and swimming pool to within a prescribed water level. Each pool water valve assembly is preferably fitted with a potentiometer and air solenoid coupled to the control circuit for respectively determining the position of each respective water valve and controlling the position of each water valve. The system also features a central, programmable processing unit and apparatus for transmitting data between a remote location and the processing unit.

26 Claims, 2 Drawing Sheets

SWIMMING POOL CONTROL SYSTEM HAVING CENTRAL PROCESSING UNIT AND REMOTE COMMUNICATION

BACKGROUND OF THE INVENTION

1. Field of the Invention

The present invention relates generally to swimming pool systems, and more particularly to a swimming pool control system which automatically maintains a selected water level and which provides protection against high water and low water conditions and system malfunction and automatically controls individual pool system components.

2. Background of the Invention

To compensate for an increase or decrease in water level, such as might occur over varying periods of time as a result of precipitation or evaporation, swimming pools are often provided with an automatic water level control system. In addition to controlling a Fall valve to admit water to the pool, and a dump valve to withdraw water from the pool, such control systems may also control ancillary pool system components, such as filter and cleaner recirculation pumps.

An example of such a pool control system is disclosed in U.S. Pat. No. 3,991,742 in which the flow of water is controlled by gate valves which are manually operated. The pool water control system is provided with a simple timer that controls a plurality of valves. Thus, the filter pump can be switched off and on by the timer, and the gate valves can be operated by solenoids and coupled to the timer. Such "controlling" of the pumps and other water-conditioning apparatus in recreational pool systems, therefore, has been relatively simplistic and largely based upon user convenience rather than any attempt at providing energy efficiency.

The control timers which have previously been used with recreational pool systems have also generally been relatively simple controllers in that timing functions proceeded independently and without any feedback as to operating conditions in the pool system or the functioning or failure of the other water conditioning apparatus.

The ability to truly attain any automated pool system requires a controller that not only can perform timed sequencing of water-conditioning functions, but can also sense the operation of the equipment during performance of the water conditioning functions, and preferably, can effect automatic feedback operation of pool equipment during such performance of water conditioning functions. Moreover, the ability to sense operation of the pool water-conditioning apparatus and to make control decisions based upon the operation of such apparatus allows the controller to protect the system against "mindless" continued operation that can eventually destroy or endanger the apparatus.

SUMMARY OF THE INVENTION

The present invention provides a control system which is adapted to be implemented in a swimming pool system. The swimming pool system of a preferred embodiment preferably includes water outtake pipes connected to a first water pump assembly and a pool water surge tank wherein a first valve assembly controls pool water flow from the first water pump assembly to the surge tank. The surge tank is preferably connected to pool filter means wherein a second valve assembly controls pool water flow from the surge tank to the filter means. The swimming pool system of the preferred embodiment further preferably includes a second water pump assembly for pumping filtered pool water from the filter means to the swimming pool wherein a third valve assembly controls pool water flow from the second water pump assembly to the aforesaid swimming pool.

The control system preferably includes valve positioning and control means operatively associated with each aforesaid valve assembly for remotely controlling and determining the position of each valve assembly. Water level means is operatively connected with the filter means and surge tank for determining the pool water level therein. Further, water flow means is operatively connected to the swimming pool for determining the volumetric flow of pool water from the filter means to the swimming pool.

The control system of the present invention further includes control circuit means being electrically coupled to the valve positioning means, the water level means and water flow means for enabling the control of the first, second and third valve assemblies so as to maintain a prescribed pool water flow in the aforesaid swimming pool system and for maintaining a prescribed water level in the surge tank, filter means and swimming pool.

BRIEF DESCRIPTION OF THE DRAWINGS

The foregoing features of the present invention will become more readily apparent and may be understood by referring to the following description of an illustrative embodiment of an apparatus according to the present invention, taken in conjunction with the accompanying drawings, in which.

DETAILED DESCRIPTION OF THE PREFERRED EMBODIMENTS

Figure 1:
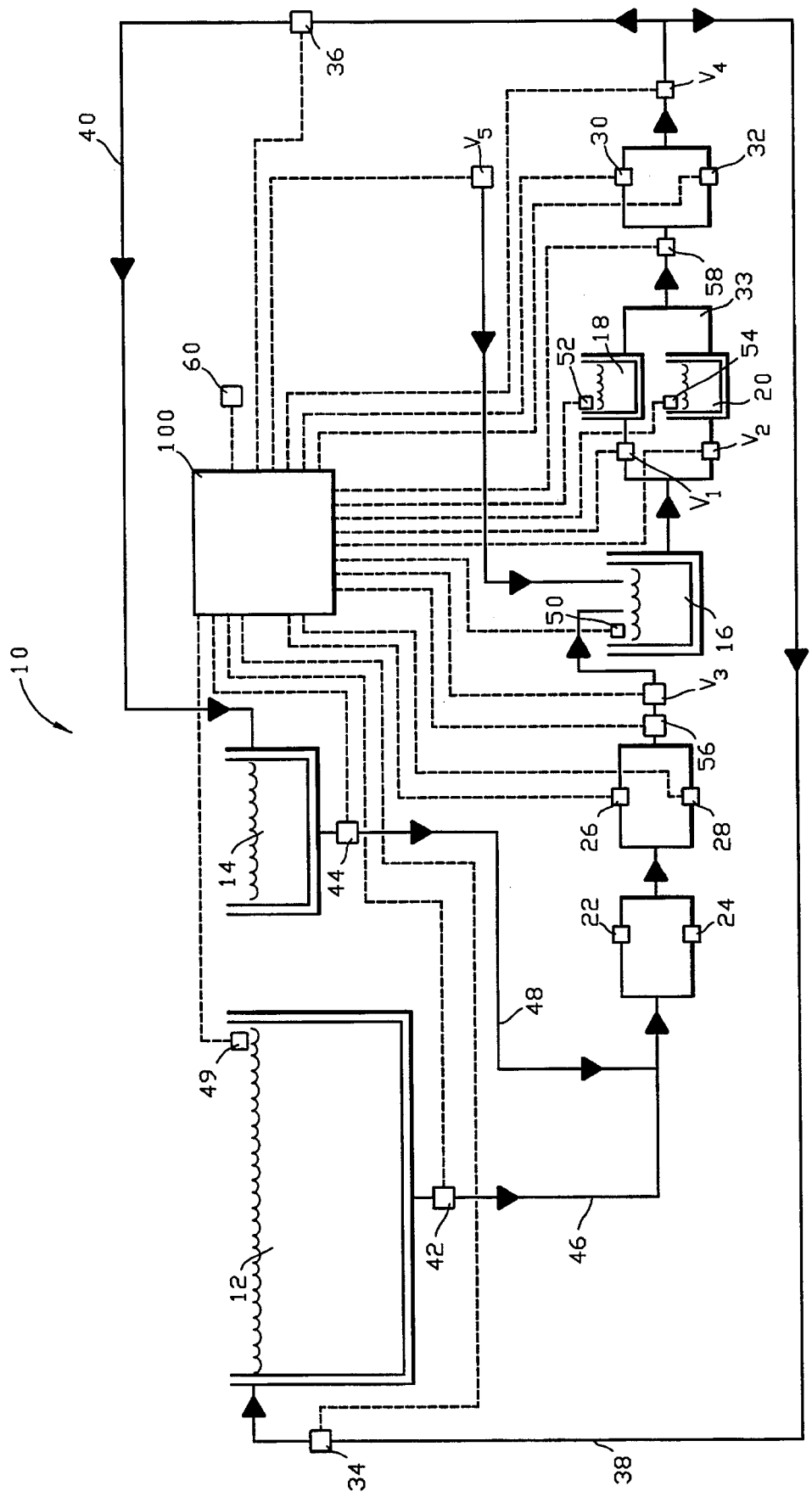
FIG. 1 is a block diagram of a pool system of a preferred embodiment implementing the control system of the present invention.
Figure 2:
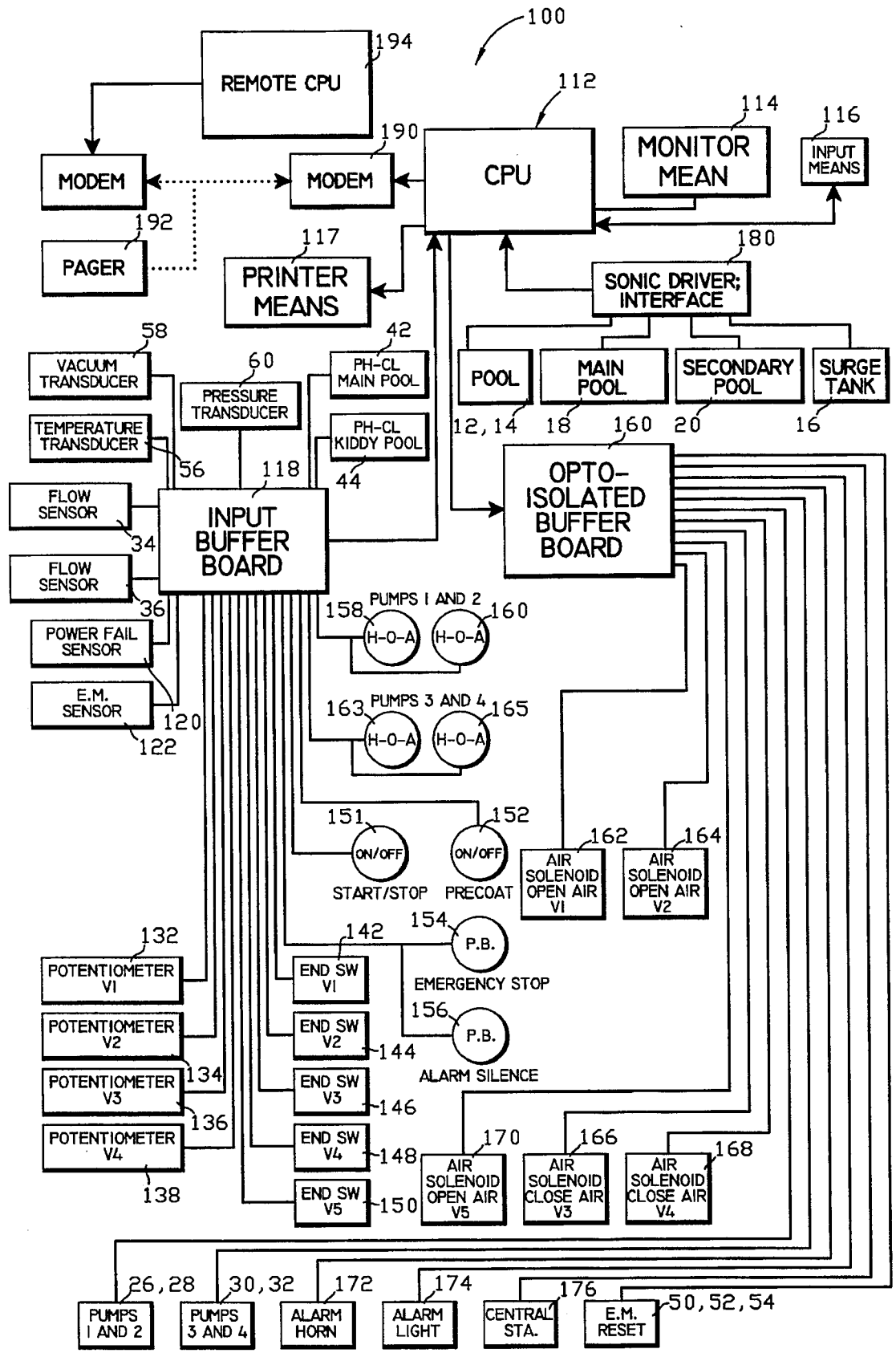
FIG. 2 is an electrical block diagram representation of the pool control system in accordance with the present invention.

Referring now in specific detail to the drawings, in which like reference numerals identify similar or identical elements, FIG. 1 illustrates a simplified public pool system, designated generally at 10, which employs the pool control system of the present invention as illustrated in FIG. 2 which is designated generally at 100. The illustrated configuration of pool system 10 is for exemplary purposes only, as the control system 100 of the present invention is intended to be employed in numerous existing and newly constructed, public and private, pool systems. It is noted that the illustrative arrows in the pool system 10 of FIG. 1 are indicative of the direction of pool water flow in pipes thereon, and the dashed lines are indicative of electrical connection between the pool control system 100 and various illustrated pool system components, as will each be described below. Further, as used herein, the expression "pool" shall include swimming pools, spas, hot tubs or other recreational pools of water. The expression "pool" water shall similarly mean water that is circulating in the pool system 10, whether or not it is directed to or from the main 12 or wading 14 swimming pool. The expression "pool" filter shall also similarly mean a filter utilizing a filter media, i.e., diatomaceous earth or sand, to clean pool water circulating therethrough. The pool system 10 of the preferred embodiment, as described below, employs diatomaceous earth filter, but it is to be appreciated that the control system 100 of the present invention is not to be limited to diatomaceous earth filters.

With reference to FIG. 1, pool system 10 of the present preferred embodiment is a public pool system including a main swimming pool 12 and a wading swimming pool 14 (i.e., a children's pool). As is conventional, pool system 10 includes a surge tank 16 and diatomaceous earth (DE) filters 18 and 20. Intermediate the surge tank 16 and the main and wading swimming pools 12 and 14 are pool water strainers 22 and 24 and pool water pumps 26 and 28 being operative to pump pool water from pools 12 and 14 to filters 18 and 20. Coupled to the outputs of DE filters 18 and 20 are pool water pumps 30 and 32 being operative to pump filtered pool water from filters 18 and 20 to main and wading pools 12 and 14.

Water flow sensors 34 and 36 are mounted in communication with intake pipes 38 and 40 of respectively the main and wading swimming pools 12 and 14 and are operative to monitor the filtered pool water flow into respectively the main and wading swimming pools 12 and 14 from DE filters 18 and 20. pH-chlorine sensors 42 and 44 are mounted in communication with the pool water flow of outtake pipes 46 and 48 from respectively the main and wading swimming pools 12 and 14, and are operative to report the pH and chlorine values of respectively the main and wading swimming pools 12 and 14. Pool system 10 additionally includes water overflow sensors 49, 50, 52 and 54 respectively mounted in pool 12, surge tank 16 and DE filters 18 and 20, and are operative to respectively detect when the surge tank 16 and/or DE filters 18 and 20 are in a water overflow condition. As will be further discussed below, the aforesaid water overflow sensors 49, 50, 52 and 54 are preferably sonic transducers operative to sonically measure the water level of the pool component which it is respectively employed within. Pool system 10 further includes temperature transducer 56 and vacuum transducer 58, wherein temperature transducer 56 is operative to measure the pool water temperature and vacuum transducer 58 is operative to measure the vacuum pressure of the filtered pool water flow from DE filters 18 and 20.

Pool water valve assemblies $V_1$ through $V_5$ are implemented in pool system 10 to control pool water flow therethrough. In particular, pool water valve assembly $V_5$ is employed to control the flow of city water into pool system 10, as will be discussed further below. In particular, water valve assemblies $V_1$ through $V_5$ each respectively include an air solenoid for effecting the opening and closure of each respective aforesaid valve $V_1$ through $V_5$ as well as an end switch for detecting when each respective valve $V_1$ through $V_5$ is in a fully closed position. Further, each water valve $V_1$ through $V_5$ is fitted with a potentiometer operative to measure the respective position of water valves $V_1$ through $V_5$. An air compressor assembly 60 is connected to each air solenoid of each aforesaid water valve assembly $V_1$ through $V_5$ for effecting the respective actuation of the opening and closure of the valves $V_1$ through $V_5$. Air compressor assembly 60 is preferably fitted with a pressure transducer for measuring air pressure of air compressor assembly 60.

As mentioned above, pool system 10 employs control system 100 which is electrically coupled to water valve assemblies $V_1$ through $V_5$, air compressor assembly 60, water flow sensors 34 and 36, pH-chlorine sensors 42 and 44, water overflow sensors 49, 50, 52 and 54, water pumps 26, 28, 30 and 32 and temperature and vacuum transducers 56 and 58. The functionality of the electrical coupling between the control system 100 and each aforesaid component will be described below.

Referring now to FIG. 1, in conjunction with FIG. 2, the pool control system 100 of the present invention will now be described. First, it is noted that a primary purpose of the pool control system 100 is to maintain a steady filter flow in the main and wading swimming pools 12 and 14, while maintaining proper water levels in DE filters 18 and 20. The control system 100 is further configured to preferably maintain water level and flow in the main and wading swimming pools 12 and 14, while also maintaining the pH and chlorine levels therein.

Additionally, the control system 100 is further configured to monitor the air pressure of air compressor assembly 60, the vacuum pressure of the outputs of DE filters 18 and 20 at transducer 58, and the electrical power to pool system 10, as well as to the control system 100 itself. In the present preferred embodiment, the control system 100 is additionally preferably configured to remotely alert and page (as will be discussed further below) a pool operator in the event of a system failure or malfunction while also enabling the operator to remotely monitor and program the pool system 10 when at a remote site therefrom (i.e., the pool operator's home). The aforesaid functions of control system 100 will be further described hereinbelow.

As seen in FIG. 2, control system 100 includes a central processing unit (CPU) 112 coupled to conventional monitor means 114, input means 116 and printer means 117. The CPU 112 may consist of various commercially available CPU's, such as a 386 processor, commercially available from Intel™. Monitor means 114 and printer means 117 may consist of any commercially available display system and printer system configured to respectively visually indicate and print information from CPU 112 to a pool operator. Further, the input means 116 may consist of a conventional ASCII keyboard as well as a plurality of buttons positioned adjacent monitor means 14.

Coupled to CPU 112 is a conventional input buffer board 118 utilized as an input interface between CPU 112 and various sensors and switches, as will be described below. Coupled to buffer board 118 are aforesaid pH-chlorine sensors 42 and 44 which are operative to measure the pH and chlorine levels of the pool water in main and wading swimming pools 12 and 14, wherein the aforesaid pH and chlorine levels are processed in CPU 112 and preferably displayed, upon command, on monitor means 114. The CPU 112 is preferably programmed to automatically indicate to the pool operator, via monitor 114, when the pH or chlorine level of the main and/or wading swimming pools 12 and 14 are either above or below a preset or optimal level.

Air compressor assembly 60 includes a pressure transducer for measuring air pressure thereof wherein the aforesaid pressure transducer is electrically coupled to CPU 112. CPU 112 is programmed to indicate upon command the aforesaid measured air pressure on monitor means 114 as well as to automatically indicate to the operator, via monitor means 114, when the measured air pressure falls below a prescribed threshold value. CPU 112 is further coupled through buffer board 118 to vacuum transducer 58, wherein CPU 112 is operative to monitor the vacuum pressure of the pool water outtakes of DE filters 18 and 20 with the CPU 112 being configured to automatically indicate to the user when the aforesaid vacuum pressure falls out of a predetermined vacuum range.

CPU 112, via input buffer board 118, is coupled to temperature transducer 56 for monitoring the pool water temperature of the main and wading swimming pools 12 and 14. CPU 112 is further coupled through buffer board 118 to pool water flow sensors 34 and 36 so as to enable CPU 112 to monitor the filtered pool water flow into the main and wading swimming pools 12 and 14 from DE filters 18 and 20.

A power failure sensor 120 is provided in control system 100 and is coupled to CPU 112, via input buffer 118. The power failure sensor 120 is operative to measure the electrical power to pool system 10 and control system 100. In the event of an electrical power failure, CPU 112 is operative to automatically switch to a battery backup supply so as to remain operational and shut down valve assemblies $V_1$ through $V_4$ until power is restored. Control system 100 also provides an emergency sensor 122 which is coupled to the aforesaid water overflow sensors 50, 52 and 54 for detecting a pool water overflow condition in surge tank 16 or DE filters 18 and 20, respectively, and relaying the detected overflow condition to CPU 112, via input buffer board 118.

As mentioned above, CPU 112 is electrically coupled to pool water valve assemblies $V_1$ through $V_5$. In particular, CPU 112, via input buffer board 118, is electrically coupled to potentiometers 132, 134, 136 and 138 of valve assemblies $V_1$ through $V_4$, respectively. CPU 112 is preferably operative to determine the valve position of each valve $V_1$ through $V_4$ through the monitoring of the resistance of each aforesaid respective potentiometer 132, 134, 136 and 138. Further, CPU 112, via input buffer board 118, is electrically coupled to each aforesaid end switch 142, 144, 146, 148 and 150 of respectively valve assemblies $V_1$ through $V_5$. The closure of the aforesaid end switches enables CPU 112 to precisely determine when the valve of each valve assembly $V_1$ through $V_5$ is in a fully closed position.

Pool system 10 and control system 100 further includes start/stop switch 151, precoat switch 152, emergency stop switch 154, alarm silence switch 156 and three-position water pump switches 158, 160, 163 and 165. The aforesaid switches am electrically coupled to CPU 112, via input buffer board 118. The functionality of the aforesaid switches will each be discussed below.

The start-stop switch 15I, via CPU 112, is operative to respectively start and stop operation of control system 100 in conjunction with the pool system 10 it is employed within. The precoat switch 152, via CPU 112, is operative to precoat DF filters 18 and 20, as will be discussed further below. Emergency stop switch 154, via CPU 112, is operative to immediately terminate operation of the aforesaid components of pool system 10 upon depression thereof. Alarm silence switch 156, via CPU 112, is operative to silence an activated alarm system, as will also be discussed further below. Three-position water pump switches 158, 160, 163 and 165, via CPU 112, are operative to respectively turn on, turn off or place in an automatic mode, pool water pumps 26, 28, 30 and 32. In particular, when an aforesaid water pump switch 158, 160, 163 or 165 is positioned in the automatic setting, CPU 112 controls the operation of each respective water pump placed in automatic mode.

An output interfacing buffer board 160 is coupled to CPU 112 so as to enable CPU 112 to control operation of the below mentioned pool system 10 components. CPU 112, via opto-isolated buffer board 160, is electrically coupled to air solenoids 162, 164, 166, 168 and 170 of respectively, air valve assemblies $V_1$–$V_5$. As will be further discussed below, CPU 112 is operative to open and close water valve assemblies $V_1$ through $V_5$ so as to control pool water flow throughout the pool system 10. CPU 112, via opto-isolated buffer board 160, is also electrically coupled to water pumps 26, 28, 30 and 32 for controlling operation of the water pumps.

An alarm horn 172 and alarm light 174 are coupled to CPU 112, via opto-isolated buffer board 160, enabling CPU 112 to automatically activate alarm horn 172 and light 174 when emergency conditions arise as detected by CPU 112. Further, CPU 112, via opto-isolated buffer board 160, is electrically coupled to a central station 176 and overflow sensors 50, 52 and 54. CPU 112 is preferably operative to reset any activated overflow sensor 50, 52 or 54, after the overflow situation has been corrected. The CPU 112 is further operative to, via central station 176, to remotely alert a remote operator if all aspects of CPU 112 fail, as will be further described below.

A sonic driver interface assembly 180 is connected to CPU 112 and is configured to measure the pool water depth of the main swimming pool 12, surge tank 16 and DE filters 18 and 20. The sonic driver interface assembly 180 preferably includes four sonic drivers configured to input information from sonic transducers 49, 50, 52 and 54 to CPU 112. Further, as mentioned above, a sonic transducers 49, 50, 52 and 54 are respectively provided in main swimming pool 12, surge tank 16 and DE filters 18 and 20 to enable sonic measurement of the pool water depth therein. As will be further discussed below, CPU 112, via interface assembly 180 and transducers 49, 50, 52 and 54, is operative to monitor the water depth of swimming pool 12, surge tank 16 and DE filters 18 and 20 so as to automatically control pool water flow thereto.

A conventional modem 190, such as a 14,400 BBS Modem, is connected to CPU 112 so as to enable remote communication between a pool operator and the control system 100. As shown in FIG. 2, modem 190 may be operative to enable electronic communication between the CPU 112 and a pager 192 and/or a second CPU 194. When communicating with a pager 192, CPU 112, via modem 190, is operative to remotely alert a pool operator's pager unit 192 of an emergency situation in pool system 10. When communicating with a second CPU 194, CPU 112 may be remotely controlled by the input devices associated with the second CPU 194.

With the configuration of the pool system 10 in conjunction with the control system 100, being discussed above, the operation of the system components will be described hereinbelow.

With continued reference to FIGS. 1 and 2, after a pool operator depresses start switch 150, CPU 112 determines the pool water level in surge tank 16, via the aforesaid transducer 50 and sonic driver interface assembly 180. If the pool water level in surge tank 16 is determined by CPU 112 to fall below a threshold value (which is preferably preprogrammed in CPU 112), pool water is then introduced into surge tank 16 from either swimming pools 12 and 14 through the opening of valve $V_3$, or from a city water supply through the opening of valve $V_5$. After the surge tank 16 is filled to a sufficient level (as preprogrammed by CPU 112) CPU 112 closes the opened one of the aforesaid valves and initiates a conventional venting timer so as to permit the filter pump pipes 31 and 33 to be purged of any air therein. After expiration of the venting time period, the pool water filter pumps 30 and 32 are then started and the pool water flow therefrom is monitored by CPU 112, via water flow sensors 34 and 36. The CPU 112 then monitors the pool water level in the main and wading swimming pools 12 and 14, via sonic driver interface assembly 180, whereby the CPU 112 effects the aforesaid pools 12 and 14 to be filled before water valves $V_1$ and $V_2$ are opened.

CPU 112 then causes DE filters 18 and 20 to be precoated. As is known to one skilled in the art, precoating a DE filter is the process in which water flow is circulated locally in DE filters 18 and 20 until DE filters 18 and 20 become properly coated so as to maintain a clear flow of water therethrough.

After CPU 112 has determined that DE filters 18 and 20 have been adequately precoated, CPU 112 activates water pumps 26, 28, 30 and 32 and controls the openings of water valve assemblies $V_1$ through $V_4$ so as to maximize pool water flow in pool system 10. During the aforesaid maximized pool water flow in pool system 10, CPU 112 constantly monitors pool water pumps 26, 28, 30 and 32 as well as the pool water levels in surge tank 16 and DE filters 18 and 20 and pool water level flow rates, via flow sensors 34 and 36. CPU 112 also constantly monitors water valves $V_1$ through $V_4$ and positions the aforesaid water valves $V_1$ through $V_4$ when needed so as to obtain the maximum pool water flow in pool system 10 without creating an overflow condition in either swimming pools 12 and 14, surge tank 16 or DE filter tanks 18 and 20. As mentioned above, CPU 112 is operative, via buffer board 160 and air solenoids 162, 164, 166, 168 and 170 to respectively control the position of pool water valves $V_1$ through $V_5$ so as to maintain an efficient maximum pool water flow in pool system 10.

In particular, filtered pool water flow is maximized through water valve $V_4$, relative to the filtering ability of the DE filter tanks 18 and 20, while the pool water level in surge tank 16 is controlled through water valve assembly $V_3$. Further, when CPU 112 determines that the water level in surge tank 16 is below a preprogrammed level, CPU 112 preferably opens water valve $V_5$, via solenoid 170, so as to fill surge tank 16 to a prescribed level, then at such a time, CPU 112 closes water valve $V_5$. This permits the "new" water to be filtered prior to introduction to the pools 12 and 14.

As mentioned above, monitor means 114 is coupled to CPU 112 and is operative to display the pool system parameters, such as the pH and chlorine levels of the main and wading swimming pools 12 and 14, the pool water flow into the main and wading swimming pools 12 and 14, the current operating sequence, the current valve positions of valves $V_1$ through $V_5$, the pool water temperature, the filter flow status and the water level of the filters 18 and 20, pools 12 and 14 and surge tank 16. When requested by the pool operator (i.e., depression of the start/stop switch 150) CPU 112 is configured to terminate filter operation in pool system with minimum water spillage and DE fall-off in DE filter tanks 18 and 20. Preferably, during the aforesaid shut-down process, CPU 112 sequentially closes water valves $V_1$ through $V_5$.

While the invention has been particularly shown and described with reference to certain preferred embodiments, it will be understood by those skilled in the art that various modifications in form and detail may be made therein without departing from the scope and spirit of the invention. Thus, the present invention is not intended to be limited to the disclosed embodiments, but it is to be accorded the widest scope consistent with the principles and features disclosed herein.

What is claimed is:

1. A control system for controlling water flow in a swimming pool system, said pool system including a swimming pool and at least one filter tank means, said control system comprising:

control circuit means for controlling at least a first valve assembly and a second valve assembly, said first valve assembly being operable to control pool water flow from a swimming pool to at least one filter tank means of said pool system, and said second valve assembly being operable to control pool water flow from said at least one filter tank means to said swimming pool when at least one sensor located at said swimming pool and electrically coupled to said control circuit means senses a decrease of a prescribed water level, said control circuit means being adapted to maintain water levels in said at least one filter tank means and said swimming pool at said prescribed water level; a programmable central processing unit and means for transmitting information from said central processing unit to a location remote from said central processing unit.

2. A pool control system as recited in claim 1, wherein said filter tank means includes diatomaceous earth filter media, and said control circuit means is adapted to precoat said filter tank means with said diatomaceous earth filter media.

3. A pool control system as recited in claim 1, wherein said first and second valve assemblies include sensor means coupled to said control circuit means for enabling said control circuit means to respectively determine the position of said first and second valve assemblies, and said first and second valve assemblies further include positioning means coupled to said control circuit means for enabling said control circuit means to respectively control the position of said first and second valve assemblies so as to control pool water flow therethrough.

4. A pool control system as recited in claim 3, wherein said sensor means of said first and second valve assemblies includes a potentiometer, wherein the resistance of each said potentiometer is determinative of the position of said first and second valve assembly, respectively.

5. A pool control system as recited in claim 1, wherein said control circuit means includes water flow sensing means for determining pool water flow into said pool from said filter tank means.

6. A pool control system as recited in claim 1, wherein said control circuit means includes a temperature transducer for determining the water temperature of said pool water and sonic calibration.

7. A pool control system as recited in claim 1, wherein said control circuit means includes vacuum transducer means operatively connected with said filter tank means for determining vacuum pressure of said filter tank means.

8. A pool control system as recited in claim 1, wherein said first and second valve assemblies include an air solenoid coupled to said control circuit means for respectively controlling the position of each said first and second valve assembly upon actuation of each respective said air solenoid.

9. A pool control system as recited in claim 8, further comprising an air compressor assembly coupled to said control circuit means and each said air solenoid for actuating each said air solenoid upon command by said control circuit means.

10. A pool control system as recited in claim 1, wherein said control circuit means further comprises a display means for displaying information to a pool operator.

11. A pool control system as recited in claim 10, wherein said control circuit means further includes modem means for transmitting pool system parameter information to a location remote from said central processing unit.

12. A pool control system as recited in claim 11, wherein said modem means is configured to be coupled to a remotely located second central processing unit, such that said second central processing unit is operative to input information to said control circuit means.

13. A control system for a swimming pool system, said swimming pool system including a swimming pool having water supply pipes connected to first water pump means and a surge tank, a first valve assembly for controlling pool water flow from said first water pump means to said surge tank, said surge tank being connected to at least one filter tank through a second valve assembly which controls pool water flow from said surge tank to said filter tank, said swimming pool system further including second water pump means for pumping filtered pool water into said swimming pool, and a third valve assembly for controlling pool water flow from said second water pump means to said swimming pool, said control system comprising:

(a) valve positioning and control means operatively associated with said first, second and third valve assemblies for remotely controlling and determining the position of each said valve assembly;

(b) water level sensing means operatively associated with said at least one filter tank and said surge tank for determining the pool water level of said at least one filter tank and said surge tank;

(c) water flow means operatively associated with said swimming pool for determining pool water flow from said at least one filter tank to said swimming pool;

(d) control circuit means electrically coupled to said valve positioning means, said water level sensing means and said water flow means for controlling said first, second and third valve assemblies so as to maintain a prescribed pool water flow in said swimming pool system and maintaining a prescribed water level in said surge tank, said at least one filter tank, and said swimming pool;

(e) a programmable central processing unit; and (f) means for transmitting information from said central processing unit to a location remote from said central processing unit.

14. A control system for a swimming pool system as recited in claim 13, wherein said valve positioning and control means includes a first, second and third potentiometer and air solenoid each respectively operatively associated with said first, second and third valve assemblies for determining the position and controlling the position of each said valve assembly.

15. A control system for a swimming pool system as recited in claim 13, wherein said water level sensing means includes first and second sonic transducers respectively provided in said at least one filter tank and said surge tank for determining water level therein, and said water level sensing means further including interfacing means for interfacing each said first and second sonic transducer with said control circuit means.

16. A control system for a swimming pool system as recited in claim 13, wherein said control system further includes a pH-chlorine sensor means in communication with said pool water of said swimming pool and electrically coupled to said control circuit means for determining the pH and chlorine level of said pool water.

17. A control system for a swimming pool system as recited in claim 13, wherein said control system further includes at least one temperature transducer in communication with said pool water of said swimming pool and being electrically coupled to said control circuit means for determining the pool water temperature of said swimming pool.

18. A control system for a swimming pool system as recited in claim 13, wherein said control system further includes first and second overflow sensing means respectively operatively connected with said surge tank and said filter tank and electrically coupled to said control circuit means for determining when said surge tank and said filter means is in a water overflow condition.

19. A control system for a swimming pool system as recited in claim 13, wherein said control circuit means is electrically coupled to said first and second water pump means and being operative to control operation of each said first and second water pump means so as to maintain a prescribed pool water flow in said swimming pool system and to maintain a prescribed water level in said surge tank, said filter tank and said swimming pool.

20. A pool control system as recited in claim 13, wherein said control circuit means includes a display means for displaying information to a pool operator.

21. A pool control system as recited in claim 20, wherein said control circuit means further includes communication means connected to said central processing unit for transmitting pool system parameter information to a location remote from said central processing unit.

22. A pool control system as recited in claim 21, wherein said communicating means is configured to be coupled to a remotely located second central processing unit, such that said second central processing unit is operative to input pool system parameter information to said central processing unit.

23. A pool water valve assembly for controlling pool water flow in a pool system and configured to be coupled to a swimming pool control system, said pool water valve assembly comprising:

a water valve being actuable between an open position and a closed position by valve control means;
said valve control means including:

(a) a potentiometer operatively connected to said water valve and electrically coupled to said pool control system, wherein the resistance of said potentiometer is indicative of the position of said water valve; and (b) actuation means operatively connected to said water valve and electrically coupled to water level sensing means of said pool control system, wherein said water level sensing means senses pool water level and transmits information to said actuation means, said actuation means being operative to actuate said water valve between said open and closed positions to maintain level of said pool water at a prescribed level and further comprising a programmable central processing unit and means for transimitting information from said central processing unit to a location remote from said central processing unit.

24. A pool water valve assembly as recited in claim 23, wherein said actuation means is an air solenoid operatively connected to an air compressor assembly.

25. A control system configured for remotely controlling a swimming pool control system, said swimming pool control system including processor means configured to automatically control pool system components, said control system comprising:

communication means coupled to said processor means for connecting said processor means to a communication line; and water level sensing means electrically coupled to said processor means for sensing pool system water levels and transmitting said sensed water levels to said communication line via said processor means and communication means to a location remote from said processor means.

26. A control system as recited in claim 25, further including a second processor means configured to communicate with said first processor means via said communicating means.

* * * * *